United States Patent [19]
Guzeev et al.

[11] Patent Number: 4,814,013
[45] Date of Patent: Mar. 21, 1989

[54] CHEMICALLY RESISTANT CONCRETE BASED ON WATER GLASS

[75] Inventors: Evgeny A. Guzeev; Ivan E. Putlyaev; Anatoly N. Pimenov; Vladimir M. Borisenko; Vladimir A. Otrepiev, all of Moscow; Valery S. Radjukhin, Zheleznodorzhny; Alexei M. Astashov, Saransk; Lidia P. Kurasova, Moscow; Valery G. Sharov, Saransk; Nina P. Ledneva; Igor F. Rudenko, both of Moscow, all of U.S.S.R.

[73] Assignee: Nauchno-Issledovatelsky Institut Betona I Zhelezobetona, U.S.S.R.

[21] Appl. No.: 19,054

[22] Filed: Feb. 26, 1987

[51] Int. Cl.$^4$ .............................................. C04B 19/04
[52] U.S. Cl. ...................................... 106/84; 106/85; 106/DIG. 2
[58] Field of Search ...................... 106/84, DIG. 2, 85

[56] References Cited

U.S. PATENT DOCUMENTS 4,311,530  1/1982  Pimenov et al. ...................... 106/84

FOREIGN PATENT DOCUMENTS 306093   7/1971   U.S.S.R. .
513955   7/1976   U.S.S.R. .
197707   7/1977   U.S.S.R. ................................ 106/84
882965  11/1981   U.S.S.R. .
903338   2/1982   U.S.S.R. ................................ 106/84
903339   2/1982   U.S.S.R. ................................ 106/84

Primary Examiner—William R. Dixon, Jr.
Assistant Examiner—Andrew Griffis
Attorney, Agent, or Firm—Ladas & Parry

[57] ABSTRACT

A mix for producing a chemically resistant concrete which comprises, percent by mass:
liquid glass: 8 to 18
a finely divided volcanic acid water-containing glass: 30 to 40
a modifying additive such as silicon dioxide of a crystalline modification: 1 to 6
and/or kaolinite of the pelitic structure: 1 to 5
and/or melaminocyanurate: 0.2 to 1.0
an alkali-acid-resistant aggregate: the balance.

12 Claims, No Drawings

CHEMICALLY RESISTANT CONCRETE BASED ON WATER GLASS

FIELD OF THE INVENTION

The present invention relates to construction materials and, more particularly, to a mix for a chemically resistant concrete based on water glass. Concretes produced from the mix of this invention will be useful in the manufacture of building and process structures operating under conditions of strongly aggressive liquid or gaseous media at enterprises of ferrous and non-ferrous metallurgy, chemical industry.

PRIOR ART

Known in the art are mixes containing water glass, fine quartz sand, perlite and a curing agent such as fluosilicates employed in the preparation of mortars, compounds and mastics intended for corrosion-protective coatings. These coatings have a structure with a low thermodynamic stability and, hence, they feature a high water-absorption, low water-resistance, a limited resistance in aggressive media.

The curing agent employed in the mixes has a high toxicity which brings about difficulties in their preparation.

Known in the art is a mix for the production of an acid-resistant concrete (cf. USSR Inventor's Certificate No. 306093, Int.Cl.$^3$ C 04 B 19/04) containing water glass, perlite of fractions of less than 0.14 mm and 0.14–5 mm, andesite rubbles at the following proportions of the components, percent by mass:

water glass ($\rho=1.34$ g/cm$^3$): 15 to 25
perlite of the fraction of less than 0.14 mm: 10 to 20
perlite of the fraction of 0.14–5 mm: 15 to 25
andesite rubbles of fractions of above 5 mm: the balance.

The concrete produced from this mix has a compression strength of 28.0–29.0 MPa, bending strength—9.6–11.0 MPa. The resistance of this concrete determined by the mass alteration during boiling in a 40% sulphuric acid for 1.5 hour is 96.3–97.2%.

In addition to a high acid-resistance this concrete has a high-pore structure and has a low mechanical strength and a low water-resistance.

Also known in the art is a mix for the production of a silicate concrete (cf. USSR Inventor's Certificate No. 513955 Int.Cl.$^3$ C 04 B 19/04) containing, percent by mass:

water glass: 15 to 25
ground granulated slag: 20 to 30
aggregate: 40 to 55
finely divided quartz sand with a specific surface area of 2,000–2,500 cm$^2$/g: the balance.

The durability of the concrete produced from this mix is as high as 80–100 MPa due to incorporation of finely divided quartz sand which comprises an active portion of the slag-glass binding agent. At the same time, the concrete produced from this mix features a high acid-permeability.

Known in the art is a mix for the production of a chemically resistant concrete (cf. USSR Inventor's Certificate No. 882965, Int.Cl.$^3$ C 04 B 19.04) having the following composition, percent by mass:

water glass: 12 to 13
finely divided aggregate: 33 to 34
acid-alkali-resistant aggregate: the balance.

The concrete produced from this mix has a low level of a long-time durability at a combined effect of a mechanical load and of an aggressive medium, a high acid-permeability and water-absorption and a low water-resistance.

SUMMARY OF THE INVENTION

It is an object of the present invention to provide a mix for the production of a chemically resistant concrete ensuring, thereto, a high level of a long-time durability at a combined effect of a mechanical load and an aggressive medium and a low acid-permeability, as well as a high water-resistance.

This object is accomplished by the provision of a mix for the production of a chemically resistant concrete comprising water glass, finely divided volcanic acid water-containing glass, an acid-alkali-resistant aggregate, which, according to the present invention, incorporates silicon dioxide of a crystalline modification and/or kaolinite of the pelitic structure, and/or melaminocyanurate at the following proportions of the components, percent by mass:

water glass: 8 to 18
finely divided volcanic acid water-containing glass: 30 to 40
crystalline silicon dioxide: 1 to 6
and/or kaolinite of the pelitic structure: 1 to 5
and/or melaminocyanurate: 0.2 to 1.0
acid-alkali-resistant aggregate: the balance.

The incorporation of one of the above-specified modifying agents or mixtures thereof into the mix results in a considerable improvement of physico-mechanical properties of the resulting chemically resistant concrete which enhance the efficiency of its application in construction and process structures to be operated under high mechanical loads in aggresive media. Thus, this concrete, when compared to the known one (cf. USSR Inventor's Certificate No. 882965) has the following advantages:

a higher level of a long-time durability at a combined effect of a mechanical load and an aggressive medium, by 25–45%;
lowered acid-permeability of 60–64%;
lowered water-absorption by 28–30%
increased water-resistance by 10–15%.

To reduce acid-permeability of the chemically resistant concrete, to impart a high elasticity modulus thereto along with a high level of a long-time durability under air-dry conditions and upon the effect of acids, it is advisable that the mixture have the following composition, percent by mass:

water glass: 12 to 15
finely divided water-containing acid volcanic glass-obsidian: 35 to 40
crystalline silicon dioxide: 1 to 6
an acid-alkali-resistant aggregate: the balance.

To ensure a high level of a long-time durability of the chemically resistant concrete in water it is preferable that the mix have the following composition, percent by mass:

water glass: 8 to 12
finely divided volcanic glass-perlite: 30 to 35
kaolinite of the pelitic structure: 1 to 5
an acid-alkali-resistant aggregate: the balance.

To employ the chemically resistant concrete in aggressive media of various types (acid, neutral, alkali), it is advisable that the mix have the following composition, percent by mass:

water glass: 15 to 18
perlite: 32 to 34
crystalline silicon dioxide: 2 to 4
kaolinite of the pelitic structure: 2 to 4
acid-resistant aggregate: the balance.

The highest characteristics of water-absorption and water-resistance of the chemically resistant concrete according to the present invention are ensured owing to introduction, into the mix composition, of 0.4–0.6% by mass of melaminocyanurate.

DETAILED DESCRIPTION OF THE INVENTION

The mix according to the present invention for the production of a chemically resistant concrete of the above-mentioned formulations is prepared in the following manner.

A mix is prepared from dry components by intermixing an acid-alkali-resistance aggregate, a finely divided volcanic glass and modifying agents such as crystalline silicon dioxide and/or kaolinite of the pelitic structure. The resulting mix is combined and intermixed with water glass and a modifying additive-melaminocyanurate till the formation of a homogeneous mix for the production of a chemically resistant concrete.

The quantitative selection of the components is defined by the predetermined physico-mechanical characteristics of the chemically resistant concrete to be produced.

Depending on requirements imposed on the concrete upon its operation in diverse aggressive media, the mix can incorporate either one of the above-specified modifying additives or a mixture thereof in different combinations.

The thus-prepared mix is charged into moulds, densified and subjected to a hydrothermal treatment under a pressure of from 0.6 to 1.2 MPa for a period of from 6 to 10 hours.

As the acid-alkali-resistant aggregate use can be made of quartz sand and rubble of granite, quartzite, diabase and andesite origin.

As the volcanic glass use can be made of perlite, obsidian, vitrophyre.

A positive effect is ensured upon introduction, into the mix, of modifying additives in the following amounts, percent by mass:
crystalline silicon dioxide: 1 to 6
kaolinite of the pelitic structure: 1 to 5
melaminocyanurate: 0.2 to 1.0.

The incorporation, into the mix formula, of silicon dioxide in the above-specified amounts contributes to the formation of a more organized structure of the type of feldspars in the hardened concrete. At a content of silicon dioxide in the mix in an amount of below 1% by mass, in addition to feldspars mordenite is also formed which results in a lowered level of a long-time durability of concrete in aggressive media.

The introduction of silicon dioxide into the mix in an amount of above 6% by mass is inexpedient, since it does not change the structure of the concrete and acts as an inert aggregate.

In the system water glass-perlite (obsidian, vitrophyre) a considerable amount of a free alkali is present in addition to water-resistant minerals of the feldspar type.

Kaolinite of the pelitic structure introduced into the mix in an amount ranging from 1 to 5% by mass reacts with this alkali with the formation of water-insoluble aluminosilicates which are responsible, when present in the concrete, for a higher level of its long-time durability in water and in an alkali.

The effect of melaminocyanurate on the concrete structure is defined by its hydrophobic action. When introduced into the mix in an amount of less than 0.2% by mass, the hydrophobic effect is exhibited insignificantly, the concrete has a high water-absorption and a limited water-resistance, while in an amount of over 1% by mass it does not result in a further improvement of physico-mechanical characteristics of the concrete.

The elasticity modulus, as well as compression strength and tensile strength of a concrete produced from the above-specified mix were determined following standard testing procedures.

The resistance factor of the concrete according to the present invention is determined as a ratio of the ultimate compression strength of samples after 36 hours of boiling in a corresponding medium to the ultimate compression strength of similar samples stored under air-dry conditions.

The level of a long-time durability of a concrete in a corresponding aggressive medium shows the capability of the concrete to whtstand long-time application of loads.

The level of a long-time durability of the concrete is determined for all of its compositions according to the procedure described hereinbelow.

The durability of a concrete sample is determined in a press upon a short-time increasing load up to breakdown (for example, R=100 MPa, wherein R is an ultimate strength) then the sample is compressed to a load close to the ultimate one (for example $\sigma=0.95$ R, i.e. R=95 MPa, wherein $\sigma$ is a stress in the concrete upon compression) and the time from the moment of the sample loading till its breakdown is recorded. Then the level of loading for new samples is lowered to $\sigma=0.90$ R, $\sigma=0.85$ R, $\sigma=0.80$ R and so one; in doing so, for each level of loading the time of the concrete existence under load is recorded. The thus-obtained data are used for plotting a curve, in the system of coordinates "level of loading vs. time", showing the time of existence of the concrete under a particular load. From the resulting plot the level of loading against the breaking load is determined for a sample by extrapolation, which level can be withstood by the sample for an indefinite period of time. This level of loading serves as the level of a long-time durability of the concrete.

In the determination of the level of a long-time durability of the concrete in aggressive media, samples of the concrete have been preliminarily subjected to boiling for 36 hours and residence in appropriate aggressive media till an ultimate saturation. The residence of the concrete samples under load, as it has been described hereinbefore, is also arranged under conditions of a continuous effect of aggressive media.

EXAMPLES OF CARRYING OUT THE INVENTION

Given hereinbelow are specific examples illustrating the production of a chemically resistant concrete from the mix according to the present invention of various compositions.

EXAMPLE 1

A mix is prepared from dry components by intermixing 920 kg of obsidian, 460 kg of quartz sand, 506 kg of granite rubble, 138 kg of crystalline silicon dioxide. The resulting mix is intermixed with water glass taken in the amount of 276 kg.

The thus-prepared mix for the production of a chemically resistant concrete has the following composition, percent by mass:
water glass: 12
obsidian: 40
crystalline silicon dioxide: 6
rubbles: 22
sand: 20.

The thus-produced concrete in the form of cubic samples is subjected to physico-mechanical tests; the results obtained are shown in the Table hereinbelow.

EXAMPLE 2

A mix is prepared from dry components by intermixing 805 kg of obsidian, 575 kg of quartz sand, 552 kg of granite rubbles, 23 kg of crystalline silicon dioxide. The resulting mix is combined with water glass taken in the amount of 345 kg till a fully homogeneous mixture is produced.

The thus-prepared mix for the production of a chemically resistant concrete has the following composition, percent by mass:
water glass: 15
obsidian: 35
crystalline silicon dioxide: 1
rubbles: 24
sand: 25.

The mix is charged into a mould and subjected to a hydrothermal treatment under the pressure of 0.8 MPa for 6 hours.

The thus-produced concrete in the form of cubic samples is subjected to physico-mechanical tests the results of which are shown in the Table hereinbelow.

EXAMPLE 3

A mix is prepared from dry components by intermixing 805 kg of perlite, 506 kg of quartz sand, 690 kg of quartzite rubbles, 115 kg of kaolinite of the pelitic structure. The resulting mixture is combined with water glass taken in the amount of 184 kg until a fully homogeneous mix is obtained.

The thus-prepared mix for the production of a chemically resistant concrete has the following composition, percent by mass:
water glass: 8
perlite: 35
kaolinite of the pelitic structure: 5
rubbles: 30
sand: 22.

The mix is charged into a mould and subjected to a hydrothermal treatment under the pressure of 0.9 MPa for 10 hours.

The resulting concrete in the form of cubic samples is subjected to physico-mechanical tests the results of which are shown in the Table hereinbelow.

EXAMPLE 4

A mix is prepared from dry components by intermixing 690 kg of perlite, 575 kg of quartz sand, 736 kg of quartzite rubbles, 23 kg of kaolinite of the pelitic structure. The thus-prepared mix is blended with water glass taken in the amount of 276 kg until a fully homogeneous mix is obtained.

The thus-prepared mix for the production of a chemically resistant concrete has the following composition, percent by mass:
water glass: 12
perlite: 30
kaolinite of the pelitic structure: 1
rubbles: 32
sand: 25.

The mix is charged into a mould and subjected to a hydrothermal treatment under the pressure of 0.8 MPa for the period of 8 hours.

The resulting concrete in the form of cubic samples is subjected to physico-mechanical tests the results of which are given in the Table hereinbelow.

EXAMPLE 5

A mix is prepared from dry components by blending 782 kg of perlite, 460 kg of quartz sand, 529 kg of diabase rubbles, 92 kg of silicon dioxide of a crystallinte structure, 92 kg of kaolinite of the pelitic structure. The resulting mix is combined with water glass taken in the amount of 345 kg until a fully homogeneous mixture is obtained.

The resulting mix for the production of a chemically resistant concrete has the following composition, percent by mass:
water glass: 15
perlite: 34
crystalline silicon dioxide: 4
kaolinite of the pelitic structure: 4
rubbles: 23
sand: 20.

The mix is charged into a mould and subjected to a hydrothermal treatment under the pressure of 1.0 MPa for 6 hours.

The thus-produced concrete in the form of cubic samples is subjected to physico-mechanical tests the results of which are shown in the Table hereinbelow.

EXAMPLE 6

A mix is prepared from dry components by blending 736 kg of perlite, 460 kg of quartz sand, 598 kg of diabase rubbles, 46 kg of crystalline silicon dioxide and 46 kg of kaolinite of the pelitic structure. The resulting blend is mixed with water glass taken in the amount of 414 kg until a fully homogeneous mixture is obtained.

The resulting mix for the production of a chemically resistant concrete has the following composition, percent by mass:
water glass: 18
perlite: 32
crystalline silicon dioxide: 2
kaolinite of the pelitic structure: 2
rubbles: 26
sand: 20.

The mix is charged into a mould and subjected to a hydrothermal treatment under the pressure of 1.2 MPa for the period of 6 hours.

The thus-produced concrete in the form of cubic samples is subjected to physico-mechanical tests the results of which are shown in the Table hereinbelow.

EXAMPLE 7

A mix is prepared from dry components by blending 920 kg of perlite, 414 kg of quartz sand, 754 kg of granite rubbles. The resulting mix is combined with water glass taken in the amount of 184 kg and with 23 kg of melaminocyanurate until a fully homogeneous mixture is obtained.

The resulting mix for the production of a chemically resistant concrete has the following composition, percent by mass:
water glass: 8
perlite: 40
melaminocyanurate: 1
rubbles: 33
sand: 18.

The mix is charged into a mould and subjected to a hydrothermal treatment under the pressure of 0.8 MPa for 8 hours.

The resulting concrete shaped as cubic samples is subjected to physico-mechanical tests the results of which are shown in the Table hereinbelow.

EXAMPLE 8

A mix is prepared from dry components by blending 690 kg of perlite, 621 kg of quartz sand, 570.4 kg of granite rubbles. The resulting mix is blended with water glass in the amount of 414 kg and with 4.6 kg of melaminocryanurate until a fully homogeneous mixture is obtained.

The thus-produced mix for the production of a chemically resistant concrete has the following composition, percent by mass:
water glass: 18
perlite: 30
melaminocyanurate: 0.2
rubbles: 24.8
sand: 27.

The mix is charged into a mould and subjected to a hydrothermal treatment under the pressure of 0.6 MPa for 10 hours.

The resulting concrete in the form of cubic samples is subjected to physico-mechanical tests the results of which are shown in the Table hereinbelow.

EXAMPLE 9

A mix is prepared from dry components by blending 920 kg of obsidian, 469.2 kg of quartz sand, 621 kg of diabase rubbles, 92 kg of crystalline silicon dioxide. The resulting mix is combined with liquid glass taken in the amount of 184 kg and with 13.8 kg of melaminocyanurate until a fully homogeneous mixture is obtained.

The thus-prepared mix for the production of a chemically resistant concrete has the following composition, percent by mass:
water glass: 8
obsidian: 40
crystalline silicon dioxide: 4
melaminocyanurate: 0.6
rubbles: 27
sand: 20.4.

The mix is charged into a mould and subjected to a hydrothermal treatment under the pressure of 0.7 MPa for 9 hours.

The resulting concrete shaped as cubic samples is subjected to physico-mechanical tests the results of which are shown in the Table hereinbelow.

EXAMPLE 10

A mix is prepared from dry components by blending 690 kg of obsidian, 529 kg of quartz sand, 588.8 kg of diabase rubbles, 46 kg of crystalline silicon dioxide. The resulting mix is blended with water glass taken in the amount of 414 kg and with 9.2 kg of melaminocyanurate until a fully homogeneous mixture is obtained.

The thus-prepared mix for the production of a chemically resistant concrete has the following composition, percent by mass:
water glass: 18
obsidian: 30
crystalline silicon dioxide: 2
melaminocyanurate: 0.4
rubbles: 25.6
sand: 23.

The mix is charged into a mould and subjected to a hydrothermal treatment under the pressure of 0.9 MPa for 7 hours.

The resulting concrete shaped as cubic samples is subjected to physico-mechanical tests the results of which are shown in the Table hereinbelow.

EXAMPLE 11

A mix is prepared from dry components by blending 920 kg of perlite, 414 kg of quartz sand, 584.2 kg of quartzite rubbles, 92 kg of crystalline silicon dioxide, 92 kg of kaolinite of the pelitic structure. The thus-prepared mix is combined with water glass taken in the amount of 184 kg and 13.8 kg of melaminocyanurate till a fully homogeneous mixture is obtained.

The thus-prepared mix for the production of a chemically resistant concrete has the following composition, percent by mass:
water glass: 8
perlite: 40
crystalline silicon dioxide: 4
melaminocyanurate: 0.6
kaolinite of the pelitic structure: 4
rubbles: 25.4
sand: 18.

The mix is charged into a mould and subjected to a hydrothermal treatment under the pressure of 1.0 MPa for the period of 7 hours.

The thus-produced concrete shaped as cubic samples is subjected to physico-mechanical tests the results of which are shown in the Table hereinbelow.

EXAMPLE 12

A mix is prepared from dry components by blending 690 kg of perlite, 478.4 kg of quartz sand, 616.4 kg of quartzite rubbles, 46 kg of crystalline silicon dioxide and 46 kg of kaolinite of the pelitic structure. The thus-prepared mix is blended with water glass taken in the amount of 414 kg and with 9.2 kg of melaminocyanurate until a fully homogeneous mixture is obtained.

The thus prepared mix for the production of a chemically resistant concrete has the following composition, percent by mass:
water glass: 18
perlite: 30
crystalline silicon dioxide: 2
melaminocyanurate: 0.4
kaolinite of the pelitic structure: 2
rubbles: 26.8
sand: 20.8.

The mix is charged into a mould and subjected to a hydrothermal treatment under the pressure of 0.8 MPa for the period of 8 hours.

The thus-produced concrete in the form of cubic samples is subjected to physico-mechanical tests the results of which are shown in the Table hereinbelow.

TABLE

| Example No. 1 | Strength, MPa | | Resistance factor | | Water absorption, % | Acid permeability, mm |
|---|---|---|---|---|---|---|
| | compression 2 | tensile 3 | in water 4 | in 20% H$_2$SO$_4$ 5 | 6 | 7 |
| 1 | 100 | 8.7 | 0.86 | 0.94 | 5.0 | 15 |
| 2 | 100 | 8.5 | 0.86 | 0.94 | 4.9 | 15 |
| 3 | 130 | 11.8 | 0.92 | 0.95 | 4.9 | 33 |
| 4 | 135 | 12.1 | 0.94 | 0.96 | 4.8 | 35 |
| 5 | 130 | 11.8 | 0.92 | 0.95 | 4.9 | 14 |
| 6 | 135 | 12.1 | 0.94 | 0.96 | 4.8 | 15 |
| 7 | 135 | 12.1 | 0.94 | 0.95 | 3.3 | 24 |
| 8 | 140 | 12.3 | 0.95 | 0.96 | 3.4 | 24 |
| 9 | 130 | 10.6 | 0.94 | 0.95 | 3.3 | 14 |
| 10 | 130 | 8.3 | 0.95 | 0.96 | 3.4 | 15 |
| 11 | 135 | 12.1 | 0.94 | 0.95 | 3.3 | 14 |
| 12 | 140 | 12.3 | 0.95 | 0.96 | 3.4 | 15 |

| Example No. 1 | Elasticity modulus, mPa 8 | Level of long-time durability of the concrete, compression strength | | | |
|---|---|---|---|---|---|
| | | in air 9 | in water 10 | in 20% H$_2$SO$_4$ 11 | in 5% NaOH 12 |
| 1 | 55,000 | 0.75 | 0.65 | 0.50 | 0.20 |
| 2 | 54,000 | 0.75 | 0.65 | 0.55 | 0.20 |
| 3 | 54,000 | 0.75 | 0.72 | 0.70 | 0.36 |
| 4 | 56,000 | 0.75 | 0.75 | 0.72 | 0.38 |
| 5 | 54,000 | 0.80 | 0.72 | 0.70 | 0.37 |
| 6 | 56,000 | 0.80 | 0.75 | 0.72 | 0.38 |
| 7 | 55,000 | 0.75 | 0.86 | 0.72 | 0.20 |
| 8 | 56,000 | 0.75 | 0.85 | 0.71 | 0.20 |
| 9 | 54,000 | 0.80 | 0.86 | 0.72 | 0.20 |
| 10 | 55,000 | 0.80 | 0.85 | 0.71 | 0.20 |
| 11 | 55,000 | 0.80 | 0.90 | 0.78 | 0.38 |
| 12 | 56,000 | 0.80 | 0.90 | 0.77 | 0.38 |

What is claimed is:

1. A concrete, comprising a composition percent by mass
Water glass: 8 to 18
finely divided volcanic glass: 30 to 40
modifying additives: 0.2 to 12
an acid-alkalai-resistant aggregate: 30 to 61.8
the composition being charged into moulds, densified and subjected to heat treatment in saturated steam under a pressure of 0.6–1.2 MPa for 6–10 hours, said concrete having a compression strength of from 100 to 140 MPa, an acid resistance factor of from 0.94 to 0.96, an acid permeability 14–35 mm and water resistance factor of 0.86–0.95.

2. A concrete as in claim 1 wherein said modifying additive is selected from one or more of the group consisting of crystalline silicone dioxide of from 1 to 6 mass%, kaolinite of the pelitic structure of from 1 to 5 mass%, melaminocyanurate of from 0.2 to 1 mass%.

3. A concrete as in claim 1 wherein the finely divided volcanic glass is selected from the group consisting of perlite, obsidian and vitrophyre.

4. A concrete as in claim 1 wherein obsidian is the finely divided volcanic glass, the composition having the following composition, percent by mass
water glass: 12–15
obsidian: 35–40
crystalline silicon dioxide: 1–6
acid-alkalai-resistant aggregate: 39–52.

5. A concrete as in claim 1 wherein said composition has the following composition percent by mass
water glass: 12–15
obsidian: 35–40
crystalline silicon dioxide: 1–6
melaminocyanurate: 0.4–0.6
acid-alkali-resistant aggregate: 38.4–51.6.

6. A concrete as in claim 1 wherein perlite is the finely divided volcanic glass, said composition having the following composition, percent by mass
water glass: 8–12
perlite: 30–35
kaolinite of the pelitic structure: 1–5
acid-alkali-resistant aggregate: 48–61.

7. A concrete as in claim 1 wherein said composition has the following composition, percent by mass
water glass: 15–18
perlite: 32–34
crystalline silicon dioxide: 2–4
kaolinite of the pelitic structure: 2–4
acid-alkali-resistant aggregate: 40–49.

8. A concrete as in claim 1 wherein in said acid-alkali-resistant aggregate is selected from one or more of the group consisting of Quartz sand, ruble of granite, quartzite, diabase and andesite.

9. A concrete as in claim 3 wherein said composition has the following composition, percent by mass
water glass: 8–18
perlite: 30–40
crystalline silicon dioxide: 1–6
kaolinite of the pelitic structure: 1–5
melaminocyanurate: 0.2–1
acid-alkali-resistant aggregate: 30–59.8.

10. A concrete, comprising a composition percent by mass
water glass: 8–12
perlite: 30–35
Kaolin of the petitic structure: 1–5
Acid-alkalai resistant aggregate: 48–61.

11. A concrete as in claim 10 wherein said acid alkali resistant aggregate is selected from one or more of the group consisting of quartz sand, and rubble of granite, quartzite diabase and andesite.

12. A concrete as in claim 11, further comprising 0.04–0.6% by mass of melaminocyanurate.

* * * * *